United States Patent
Su et al.

(10) Patent No.: US 10,165,737 B2
(45) Date of Patent: Jan. 1, 2019

(54) WARM CLOUD CATALYST, PREPARATION METHOD THEREFOR AND APPLICATION THEREOF

(71) Applicant: Yougui Yan, Kunming, Yunnan Province (CN)

(72) Inventors: Zhengjun Su, Kunming (CN); Zhengfei Li, Kunming (CN); Yougui Yan, Kunming (CN); Hui Song, Kunming (CN)

(73) Assignee: Yougui Yan, Kunming (CN)

( * ) Notice: Subject to any disclaimer, the term of this patent is extended or adjusted under 35 U.S.C. 154(b) by 0 days.

(21) Appl. No.: 15/515,186

(22) PCT Filed: Sep. 30, 2015

(86) PCT No.: PCT/CN2015/091320
§ 371 (c)(1),
(2) Date: Jul. 12, 2017

(87) PCT Pub. No.: WO2016/050222
PCT Pub. Date: Apr. 7, 2016

(65) Prior Publication Data
US 2017/0303479 A1    Oct. 26, 2017

(30) Foreign Application Priority Data

Sep. 30, 2014  (CN) .......................... 2014 1 0520520

(51) Int. Cl.
*A01G 15/00* (2006.01)

(52) U.S. Cl.
CPC .................... *A01G 15/00* (2013.01)

(58) Field of Classification Search
None
See application file for complete search history.

(56) References Cited

U.S. PATENT DOCUMENTS

| | | | |
|---|---|---|---|
| 3,608,810 A * | 9/1971 | Kooser .................. | A01G 15/00 239/2.1 |
| 4,222,778 A | 9/1980 | Nuzzi et al. | |
| 4,694,036 A | 9/1987 | Baldi | |
| 2002/0018815 A1 * | 2/2002 | Sievers .................. | A61K 9/008 424/489 |
| 2005/0043416 A1 | 2/2005 | Moller | |
| 2005/0056705 A1 * | 3/2005 | Bhumibol Adulyadej ........... | A01G 15/00 239/2.1 |

FOREIGN PATENT DOCUMENTS

| | | |
|---|---|---|
| CN | 1225929 | 8/1999 |
| CN | 1247638 | 3/2000 |
| CN | 1510063 | * 7/2004 |
| CN | 1543310 | 11/2004 |
| CN | 1557131 | 12/2004 |
| CN | 103960097 | 8/2014 |
| CN | 104322334 | 2/2015 |

OTHER PUBLICATIONS

"Father of Royal Rainmaking" Ministry of Agriculture and Cooperatives, Thailand, ISBN 974-403-012-7. Dec. 2001 (Year: 2001).*
First Office Action in Chinese Application No. CN 2014105205205, 17 pages (English Translation).
First Search Report in Chinese Application No. CN 2014105205205, 2 pages (English Translation).
International Preliminary Report on Patentability in International Application No. PCT/CN2015/091320, dated Apr. 4, 2017, 12 pages (English Translation).
International Search Report and Written Opinion in International Application No. PCT/CN2015/091320, dated Jan. 6, 2016, 17 pages (English Translation).
Notification of Grant Patent Right for Invention in Chinese Application No. CN 2014105205205, 4 pages (English Translation).
Second Office Action in Chinese Application No. CN 2014105205205, 7 pages (English Translation).
Supplementary Search Report in Chinese Application No. CN 2014105205205, 1 pages (English Translation).

* cited by examiner

*Primary Examiner* — Colin W Slifka
*Assistant Examiner* — Colette B Nguyen
(74) *Attorney, Agent, or Firm* — Fish & Richardson P.C.

(57) ABSTRACT

Disclosed are a warm cloud catalyst, a preparation method and an application thereof. The warm cloud catalyst comprises the following components in parts by weight: plant powder/plant ash/plant carbon powder 80-120 parts; surfactant dry powder 0.5-5 parts or a surfactant solution 15-32 parts; and a thickening agent 2-10 parts. All the components of the catalyst are easily wettable. The plant powder/plant ash/plant carbon powder is used as a dispersing agent and a vapor condensation nucleus; the surfactant can reduce surface tension of some cloud droplets and facilitate combination of the cloud droplets with other cloud droplets upon collision, so as to expand the cloud droplet spectrum; the thickening agent can absorb water and continuously expand to become large droplets in cloud. The catalyst is non-corrosive, is not easily agglomerated, is easy to store, produce and process, and is safe and nontoxic, available in material, and convenient and simple in use.

18 Claims, 2 Drawing Sheets

Figure 2:
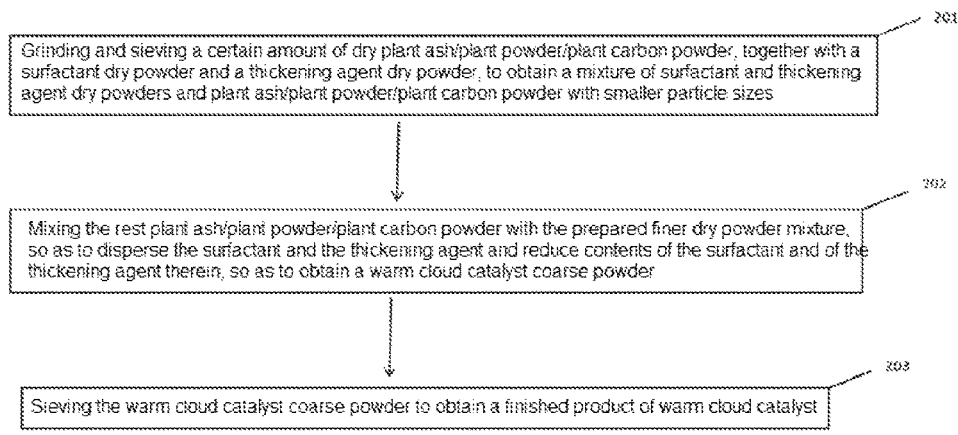

```
┌─────────────────────────────────────────┐  ─ 101
│ Preparing a surfactant solution         │
│ according to a predetermined mass       │
│ concentration                           │
└─────────────────────────────────────────┘
                    │
                    ▼
┌─────────────────────────────────────────┐  ─ 102
│ Evenly mixing the prepared surfactant   │
│ solution with a plant ash/plant powder/ │
│ plant carbon powder according to        │
│ predetermined parts by weight so as to  │
│ obtain a mixture                        │
└─────────────────────────────────────────┘
                    │
                    ▼
┌─────────────────────────────────────────┐  ─ 103
│ Drying the mixture obtained in Step     │
│ 102, then adding a thickening agent and │
│ evenly mixing and sieving to obtain a   │
│ warm cloud catalyst                     │
└─────────────────────────────────────────┘
```

Fig. 1

WARM CLOUD CATALYST, PREPARATION METHOD THEREFOR AND APPLICATION THEREOF

TECHNICAL FIELD

The present invention relates to the field of weather modification catalyst, and particularly to a warm cloud catalyst, and a preparation method and an application of the same.

BACKGROUND

Since humans began weather modification in the 1940s, warm cloud catalysts have always been a worldwide problem that is difficult to crack.

In the theoretical research on warm cloud precipitation mechanisms, the theory of collision, coalescence and breaking has been explicitly proposed. However, in the research on warm cloud catalysts, the idea that has been used for a long time is that hygroscopic substances can absorb moisture to grow at a pressure lower than the saturation vapor pressure, as for the hydrophilicity of the cloud condensation nuclei, there is no distinction, which hides the cognition to the wetting nuclei, no detailed research on surface tension difference is made with regard to the phenomena of large cloud droplets coalescing with small cloud droplets, and little is known about the source regions and features of the atmospheric aerosol particles capable of forming large water droplet-started collision mechanism.

In the related art, hygroscopic substances such as sodium chloride, calcium chloride, urea or ammonium nitrate, etc. are generally used as warm cloud catalysts; and these common hygroscopic substances all have certain corrosivity (which will corrode spraying devices), and are easy to agglomerate, and when such type of hygroscopic substances are used as warm cloud catalysts, since the falling speed of the catalyst particles is too fast, and the factor of surface tension of the aqueous solution thereof is not taken into account, the effect of artificial precipitation is extremely unsatisfactory, and at present, there is no repeatable successful case. Thus, it is difficult to practically use such kind of warm cloud catalysts in production and life.

Therefore, it is a technical problem to be solved urgently by people to provide a warm cloud catalyst which directly uses the theory of collision, coalescence and breaking as the guidance, is non-corrosive, is not easy to agglomerate, can continuously grow cloud droplets into raindrops and can be practically used.

DISCLOSURE OF THE INVENTION

An object of the present invention is to provide a completely new research approach of warm cloud catalyst and a completely new product of warm cloud catalyst, so as to solve the aforesaid technical problem. Another object of the present invention is to provide a method for preparing the aforesaid warm cloud catalyst.

In one aspect, the present invention provides a warm cloud catalyst comprising the following components in parts by weight: 80-120 parts of a plant ash/plant powder/plant carbon powder, 15-32 parts of a surfactant solution or 0.5-5 parts of a surfactant dry powder, and 2-10 parts of a thickening agent.

Optionally, in the surfactant solution, the mass concentration of the solute is 0.5%-35%.

Optionally, the plant ash/plant powder/plant carbon powder used comprises dry powders of plant materials or powders resulting from burning or carbonizing thereof, and further comprises non-plant materials having a density smaller than that of water, wherein the plant materials further comprise a starch, a cellulose, a lignin and/or a colloid which constitute a plant body.

Optionally, the plant ash/plant powder/plant carbon powder has a particle size in the range of 0.5-150 μm.

Optionally, the surfactant comprises surface active substances capable of reducing the surface tension of water by 20%-85%.

Preferably, the surfactant comprises a silicon-containing or fluorine-containing surfactant or a degradable surfactant.

Preferably, in the surfactant solution, the solute comprises one or more of polyether modified organosiloxane, polyether modified polydimethylsiloxane and perfluoroalkyl ester solution; and the solvent is water or ethanol.

Optionally, the surfactant dry powder comprises water-soluble surfactant powders. Preferably, the surfactant dry powder comprises sodium dodecylbenzenesulfonate and Akzo Morwet EFW.

Optionally, the thickening agent comprises aqueous phase thickening agents. Preferably, the thickening agent comprises xanthan gum, konjac gum, guar gum or pectin.

In another aspect, the present invention provides a method for preparing the aforesaid warm cloud catalyst, wherein when the surfactant is in a form a solution, the method includes the steps of:

1) preparing a surfactant solution, wherein in the surfactant solution, the mass concentration of a solute is 0.5%-35%;

2) evenly mixing 15-32 parts by weight of the prepared surfactant solution with 80-120 parts by weight of plant ash/plant powder/plant carbon powder to obtain a mixture; and 3) drying the mixture, then adding 2-10 parts of the thickening agent, evenly mixing, and sieving to obtain a warm cloud catalyst.

When the surfactant is in form of a dry powder, the method includes the following steps of:

a) mixing the thickening agent and surfactant powder, in a predetermined formulation dosage, with an appropriate amount of plant ash/plant powder/plant carbon powder, and grinding and sieving them to obtain a mixture of the surfactant and thickening agent dry powders and plant ash/plant powder/plant carbon powder with smaller particle sizes;

b) mixing the rest plant ash/plant powder/plant carbon powder with the prepared finer dry powder mixture, so as to disperse the surfactant and the thickening agent and reduce the contents of the surfactant and of the thickening agent therein, thereby obtaining a warm cloud catalyst coarse powder; and c) sieving the warm cloud catalyst coarse powder to obtain a finished product of warm cloud catalyst.

In yet another aspect, the present invention provides use of the aforesaid warm cloud catalyst in warm cloud precipitation, reservoir and pond water addition, precipitation redistribution, flood prevention and control or drought disasters.

For the warm cloud catalyst provided by the present invention, the preparation of the warm cloud catalyst is realized by mixing a plant ash/plant powder/plant carbon powder, a surfactant and a thickening agent in a predetermined weight ratio to obtain a hygroscopic and wetting expansion nucleus. Specifically, the surfactant has the effect of reducing the surface tension of water, wherein the aqueous solution of the surfactant formed by colliding with a cloud droplet has the ability of wetting, and the aqueous solution can wet various hydrophobic nuclei in the cloud, improving the hydrophilicity thereof and simultaneously reducing the surface tension of the nucleus-water coexisted substance, such that a surface tension difference is formed between the hydrophobic nuclei and other cloud droplets so as to provide benefits for collision and coalescence, and at the same time, while the cloud droplet further grows, the water droplets of low surface tension of the aqueous solution provide the conditions for collision and breaking; the plant ash/plant powder/plant carbon powder has a small density (about 1/10-1/4 of that of commonly used sodium chloride or calcium chloride), can stay in the air for a long time, and is used as a dispersant for the surfactant and the thickening agent in this catalyst, and it is also a good condensation nucleus; and the thickening agent serves the function of absorbing water to expand and delaying the breaking for continuous growth in the catalyst, providing a large water droplet-started collision mechanism for the cloud. After the warm cloud catalyst is spread into the cloud, as all the components of the warm cloud catalyst have hydrophilia, water vapor can initially condense and grow on the surface thereof, all the components of the warm cloud catalyst having obtained the water film collide with small cloud droplets once again and grow, and thereafter, all the components of the warm cloud catalyst begin to differentiate, small cloud droplets, taking the plant ash/plant powder/plant carbon powder as the nucleus, grow slowly, while the cloud droplets taking the surfactant powder as the nucleus or having a nucleus treated by the surfactant solution grow rapidly due to the poor surface tension, broadening the initial droplet spectrum, and when the surface tension can no longer maintain the integrity of large water droplets and the large water droplets break firstly, the thickening agent enables continuously grow to obtain large water droplets in the cloud, so as to start the collision and coalescence mechanism. The catalyst is non-corrosive, is not easy to agglomerate, is easy to store, produce and process, and is safe and nontoxic, available in material, and convenient and simple in use.

The research on warm cloud catalysts has always been a worldwide difficult problem that is difficult to crack. The reasons are as follows: for a long time, in the prior art, people have always been focusing on condensation nuclei with no consideration of the concept of wetting nuclei, have always been following the guiding ideology that hygroscopic condensation nuclei can absorb moisture to grow at a pressure lower than the saturation vapor pressure of water surface, without taking into account the property of easy wetting of nucleus and whether the coexistence of the nucleus and water has a significant advantage in collision, coalescence and breaking as compared with common cloud droplets, and have always been knowing little about the source regions and features of the atmospheric aerosol particles in the cloud that form the large water droplets and start the collision mechanism, and as a result, the cloud water in the warm and wet atmosphere cannot be utilized, which greatly limits the cloud seeding conditions.

In addition, in the prior art, the transient dew point time caused by day and night temperature difference may not be utilized to carry out artificial precipitation, which further leads to a loss of the most opportunities in weather modification. Furthermore, (warm cloud) catalysts in prior art have corrosivity, which is not beneficial to aircraft spreading; have a large density, resulting in short staying time in the air, rapid falling speed and poor transverse drift ability, wherein the contradiction between large condensation nucleus and high falling speed is intractable, which greatly reduces the probability of the catalysts colliding and coalescing with the cloud droplets; and due to the same surface tension, they have no collision and breaking advantages.

However, the present invention overcomes the shortcomings in the prior art, and provides a completely new research approach, method and product of weather modification, such that the difficult technical problem of warm cloud precipitation is solved; and provides a catalyst product of weather modification applicable to warm clouds.

The details of one or more embodiments of the invention are set forth in the accompanying drawings and the description below. Other features, objects, and advantages of the invention will be apparent from the description and drawings, and from the claims.

DESCRIPTION OF DRAWINGS

In order to more clearly illustrate the technical solutions of the embodiments of the present invention, brief description is made below on the drawings required to be used in description of the embodiments. Obviously, the drawings described below are only for illustrating the purpose rather than limiting the present invention.

FIG. 1 is a schematic diagram of a preparation flow of a warm cloud catalyst provided by the present invention.

FIG. 2 is a schematic diagram of another preparation flow of a warm cloud catalyst provided by the present invention.

Like reference symbols in the various drawings indicate like elements.

DETAILED DESCRIPTION OF EMBODIMENTS

In order to make the objectives, technical solutions and advantages of the present invention clearer, the technical solutions of the present invention will be described below clearly and completely. All the other embodiments that are obtained by a person ordinarily skilled in the art without using inventive effort on the basis of specific embodiments of the present invention shall be covered by the protection scope of the present invention. The examples of the present invention are only used to exemplify the specific embodiments, rather than limiting the present invention.

The warm cloud catalyst provided by the present invention comprises the following components in parts by weight: 80-120 parts of a plant ash/plant powder/plant carbon powder, 15-32 parts of a surfactant solution or 0.5-5 parts of a surfactant dry powder, and 2-10 parts of a thickening agent, wherein in the surfactant solution, the mass concentration of the solute is 0.5%-35%. In addition, in order to improve the catalytic capability and the precipitation effect of the warm cloud catalyst of the present invention, on the basis of the aforesaid technical solution, preferably, in a further technical solution, one or more of the following definitions may be added: the plant ash/plant powder/plant carbon powder has a particle size of 0.5-150 μm and has a water content smaller than 0.5%; the surfactant is a silicon-containing or fluorine-containing surfactant or a degradable surfactant; or in the surfactant solution, the solute is one or more selected from the group consisting of polyether modified organosiloxane, polyether modified polydimethylsiloxane and perfluoroalkyl ester solution; and the solvent is water or ethanol. In addition, the surfactant dry powder comprises sodium dodecylbenzenesulfonate and Akzo Morwet EFW. The thickening agent comprises aqueous phase thickening agents, such as rheological agents or hydrosol. Preferably, the thickening agent is one or more selected from the group consisting of xanthan gum, konjac gum, guar gum and pectin.

The present invention provides two methods for preparing the warm cloud catalyst, which, referring to FIG. 1 and FIG. 2, specifically include the steps of:

Preparation Method 1:

Step 101: preparing a surfactant solution according to a predetermined mass concentration, wherein in Step 101, the mass concentration of the surfactant solution is within the range of 0.5%-35%; therefore, after the determination of the dosage of the solute in the surfactant solution, it is needed to determine the dosage of the solvent (water or ethanol) required according to the predetermined mass concentration;

Step 102: evenly mixing, using a spray mixer, the prepared surfactant solution with plant ash/plant powder/plant carbon powder according to predetermined parts by weight, to obtain a mixture; and Step 103: drying the mixture obtained in Step 102, then adding 2-10 parts of a thickening agent, evenly mixing, and sieving to obtain the warm cloud catalyst.

Preparation Method 2:

Step 201: grinding and sieving 2-20 parts of the dried plant ash/plant powder/plant carbon powder, together with 0.5-5 parts of surfactant dry powder and 2-10 parts of thickening agent dry powder to prepare a mixture of the surfactant and thickening agent dry powders and plant ash/plant powder/plant carbon powder with smaller particle sizes;

Step 202: further mixing the rest plant ash/plant powder/plant carbon powder with the finer dry powder mixture prepared in Step 201, so as to disperse the surfactant and the thickening agent and reduce the contents of the surfactant and of the thickening agent therein; and Step 203: sieving the mixture prepared in Step 202 to obtain a final warm cloud catalyst product.

The methods for preparing a warm cloud catalyst provided by the examples of the present invention are easy to carry out, are highly controllable and can realize preparation of powdery warm cloud catalyst without a lot of manufacturing devices.

In each of the examples, dust may be generated in the production process, the inhalation of dust is harmful to body health, and therefore the production staff must wear a protective mask during the whole production process to prevent the inhalation of dust. In addition, all the components of the catalyst absorb moisture extremely easily, so during storage of the raw materials and the finished products and during the whole production process, it is necessary to keep the environment dry and the relative humidity lower than 45%, and it is required that the package of the finished product is dampproof and waterproof.

Next, the following specific examples are given for the warm cloud catalyst and the preparation method thereof in the present invention in conjunction with the above contents, and reference is made to Examples 1-7.

Example 1

The warm cloud catalyst in the present example comprises the following components in parts by weight: 80 parts of plant ash, 3 parts of 200-mesh xanthan gum, and 15.7 parts of a surfactant solution, wherein in the surfactant solution, the solute is embodied as 0.7 parts of polyether modified organosiloxane Silok®8008, and the solvent is 15 parts of water. In addition, in the surfactant solution, the mass concentration of the solute is 4.5%.

The preparation method of the warm cloud catalyst in the present example is as follows:

S1: preparing the surfactant solution:

adding 15 kg of water to 0.7 kg of polyether modified organosiloxane Silok®8008, and fully stirring for mixing for standby use; and S2: mixing, in a spray mixer, 80 kg of plant ash having a water content lower than 0.5% with the surfactant solution in a weight ratio of 80:15.7, then drying, adding 3 kg of 200-mesh xanthan gum and fully mixing, and sieving through a 30-mesh airflow sieve to obtain the warm cloud catalyst.

Example 2

The warm cloud catalyst in the present example comprises the following components in parts by weight: 100 parts of plant ash, 6 parts of 200-mesh xanthan gum and 16.3 parts of a surfactant solution, wherein in the surfactant solution, the solute is embodied as 0.8 parts of polyether modified organosiloxane Silok®8008 and 0.5 parts of Silok®8141, and the solvent is 15 parts of water. In addition, in the surfactant solution, the mass concentration of the solute is 8%.

The preparation method of the warm cloud catalyst in the present example is as follows:

S1: preparing the surfactant solution:

adding 15 kg of water to 0.8 kg of polyether modified organosiloxane Silok®8008 and 0.5 kg of Silok®8141, and fully stirring for mixing for standby use; and S2: mixing, in a spray mixer, 100 kg of plant ash having a water content lower than 0.5% with the surfactant solution in a weight ratio of 100:16.3, then drying, adding 6 kg of 200-mesh xanthan gum and fully mixing, and passing the sieving through a 40-mesh airflow sieve to obtain the warm cloud catalyst.

Example 3

The warm cloud catalyst in the present example comprises the following components in parts by weight: 120 parts of plant carbon powder, 10 parts of pectin, and 23.5 parts of a surfactant solution, wherein in the surfactant solution, the solute is embodied as 3 parts of polyether modified organosiloxane Silok®8033 and 0.5 parts of Silok®8141, and the solvent is 20 parts of water. In addition, in the surfactant solution, the mass concentration of the solute is 14.9%.

The preparation method of the warm cloud catalyst in the present example is as follows:

S1: preparing the surfactant solution:

adding 20 kg of water to 3 kg of polyether modified organosiloxane Silok®8033 and 0.5 kg of Silok®8141, and fully stirring for evenly mixing for standby use; and S2: mixing, in a spray mixer, 120 kg of plant carbon powder having a water content lower than 0.5% with the surfactant solution in a weight ratio of 120:23.5, then drying, adding 10 parts of 200-mesh pectin dry powder, and sieving through a 100-mesh sieve to obtain the warm cloud catalyst.

Example 4

The warm cloud catalyst in the present example comprises the following components in parts by weight: 100 parts of plant ash, 5 parts of a surfactant dry powder, and 2 parts of 200-mesh xanthan gum.

The preparation method of the warm cloud catalyst in the present example is as follows:

1) grinding, by using a ball mill, 4 kg of sodium dodecylbenzenesulfonate powder, 1 kg of Akzo Morwet EFW, 2 kg of 200-mesh xanthan gum, and 15 kg of plant ash dry powder having a water content lower than 0.5%, into fine powder having an average particle size smaller than 3 μm;

2) fully and evenly mixing 85 kg of plant ash with the prepared fine powder above; and 3) sieving the fully and evenly mixed catalyst through a 50-mesh sieve to obtain the final warm cloud catalyst.

Example 5

The warm cloud catalyst in the present example comprises the following components in parts by weight: 100 parts of plant ash, 3 parts of a surfactant dry powder, and 8 parts of guar gum.

The preparation method of the warm cloud catalyst in the present example is as follows:

1) grinding, by using a ball mill, 2.5 kg of sodium dodecylbenzenesulfonate powder, 0.5 kg of Akzo Morwet EFW, 8 kg of guar gum, and 12 kg of plant ash dry powder having a water content lower than 0.5%, into fine powder having an average particle size smaller than 3 μm;

2) fully and evenly mixing 88 kg of plant ash with the prepared fine powder above; and 3) sieving the evenly mixed catalyst through a 60-mesh sieve to obtain the final warm cloud catalyst.

Example 6

The warm cloud catalyst in the present example comprises the following components in parts by weight: 100 parts of plant ash, 0.5 parts of a surfactant dry powder, and 4 parts of konjac gum.

The preparation method of the warm cloud catalyst in the present example is as follows:

1) grinding, by using a ball mill, 0.5 kg of Akzo Morwet EFW, 4 kg of konjac gum, and 7 kg of plant ash dry powder having a water content lower than 0.5%, into fine powder having an average particle size smaller than 3 μm;

2) fully and evenly mixing 93 kg of plant ash with the prepared fine powder above; and 3) sieving the evenly mixed catalyst through a 70-mesh sieve to obtain the final warm cloud catalyst.

Example 7

The warm cloud catalyst in the present example comprises the following components in parts by weight: 100 parts of plant powder, 3 parts of surfactant dry powder, and 5 parts of konjac gum.

The preparation method of the warm cloud catalyst in the present example is as follows:

1) grinding, by using a ball mill, 3 kg of Akzo Morwet EFW, 5 kg of konjac gum, and 7 kg of plant powder having a water content lower than 0.5% into fine powder having an average particle size smaller than 3 μm;

2) fully and evenly mixing 93 kg of plant powder with the prepared fine powder above; and 3) sieving the evenly mixed catalyst through a 80-mesh sieve to obtain the final warm cloud catalyst.

In order to verify the technical effects of the warm cloud catalysts of Examples 1-7 of the present invention, the warm cloud catalysts of the present invention had been tested by Guiyan Detection Technology (Yunnan) Co., Ltd., Guangzhou Silok Chemical Co. Ltd. and a self-made cloud chamber. The test results are as shown in Table 1.

In the above, the surface tension was tested using a platinum ring method by an automatic interface tensometer with a model number JYW-200A.

TABLE 1

| | Example 1 | Example 2 | Example 3 | Example 4 | Example 5 | Example 6 | Example 7 |
|---|---|---|---|---|---|---|---|
| Bulk density (g/cm$^3$) | 0.35 | 0.4 | 0.65 | 0.5 | 0.54 | 0.42 | 0.68 |
| Sedimentation velocity (m/s) | 0.25 | 0.29 | 0.75 | 0.6 | 0.5 | 0.2 | 0.7 |
| Surface tension of 10% aqueous solution (dyne/cm) | 18 | 18 | 21 | 22 | 22 | 23 | 22 |
| Transverse drift effect | Good | Good | Good | Good | Good | Good | Good |

The test results indicated: for the warm cloud catalysts provided by examples 1-7 of the present invention, the bulk density measured by a bulk density meter was 0.32-0.74 g/cm$^3$, which was 15%-35% of that of traditional warm cloud catalysts sodium chloride and calcium chloride (2.15 g/cm$^3$). The average sedimentation velocity, measured by a stopwatch, in a PVC pipe having a height of 6.5 m and a diameter of 0.8 m was 0.19-0.75 m/s, which was only 6-24% of that of traditional warm cloud catalysts sodium chloride and calcium chloride (3.13 m/s, average diameter of 75 μm). Thus, the obtained warm cloud catalysts could stay in the air for a long time and have good transverse drift effect, fully ensuring the time of collision between the catalysts and the cloud droplets.

The specific surface areas of the warm cloud catalysts of Examples 1-7 were extremely large, up to 47.5 m$^2$/g in the case where the average diameter of the particles was 17 μm; the shortest time it took for the finished product to coalesce with water was several milliseconds; and the surface tension of the 10% aqueous solution thereof was only 24%-45% of the surface tension 72.5 dyne/cm of the water.

As tested in a self-made cloud chamber (the volume of a steam room being 20 cubic meters, a dry powder spraying machine was used to spray 10 g of the catalyst at a time), the products of Examples 1-7 were all capable of dispersing fog rapidly within 12-40 seconds in a 40° C. steam room, and fog regeneration was delayed for 5-10 minutes, while the blank control took about 5 minutes to disperse fog and delayed fog generation.

The tests demonstrated that the products of Examples 1-7 were all capable of forming precipitation effect under simulated conditions, and all the properties thereof were far superior to those of traditional inorganic salt warm cloud catalysts. Moreover, the products were non-corrosive, were not easily agglomerated, were easy to store, produce and process, and were safe and nontoxic, available in material, and convenient and simple in use.

In addition, when the warm cloud catalysts prepared in Examples 1-7 of the present application were used for precipitation, the warm cloud catalysts could stay in the air for a long time, and had good transverse drift effect, fully ensuring the time of collision thereof with cloud droplets, and it took a relatively short time for the warm cloud catalysts to coalesce with water.

In addition, the material, namely the plant ash/plant powder/plant carbon powder, used in the present invention comprises the dry powders of plant materials or the powders resulting from burning or carbonizing thereof, and further comprises non-plant materials having a density smaller than that of water, wherein the plant materials further comprises starch, cellulose, hemicellulose, lignin and/or colloid which constitute a plant body. The surfactant used in the present invention further comprises surface active substances capable of reducing the surface tension of water by 20%-85% when the surfactant is at the lowest critical micelle concentration value. The thickening agent comprises aqueous phase thickening agents.

In conclusion, the technical effects achieved by the present invention mainly include:

1. explicitly proposing for the first time, in the research on weather modification catalysts, taking the surface tension difference as the power for collision and coalescence of cloud droplets and taking the reduction of the surface tension of water as the focus of the research on warm cloud catalysts;

2. proposing for the first time the concept that the nuclei for warm cloud precipitation are hydrophilic wetting nuclei, so as to make it clear that the various hydrophobic nuclei in the atmosphere are non-cloud condensation nuclei;

3. using for the first time a thickening agent as a source of particles capable of growing into large droplets in the cloud to start the collision mechanism, thereby solving the problem that large condensation nuclei in the cloud fall too fast at the beginning; and 4. using for the first time the method of combining three kinds of materials, i.e., a surfactant, a thickening agent and plant powder/plant ash/plant carbon powder, for preparing the warm cloud catalysts.

The above are only preferred embodiments of the present invention, and are not used to limit the present invention. For a person skilled in the art, the present invention may have various modifications and variations. Any modifications, equivalent substitutions, improvements etc. within the spirit and principle of the present invention shall all be included in the scope of protection of the present invention.

What is claimed is:

1. A warm cloud catalyst, comprising following components in parts by weight:
    80-120 parts of a plant ash/plant powder/plant carbon powder;
    0.5-5 parts of a surfactant dry powder or 15-32 parts of a surfactant solution; and
    2-10 parts of a thickening agent.

2. The warm cloud catalyst according to claim 1, wherein the plant ash/plant powder/plant carbon powder comprises dry powders of plant materials or powders resulting from burning or carbonizing of the plant materials, and further comprises non-plant materials having a density smaller than a density of water, wherein the plant materials further comprise a starch, a cellulose, a lignin and/or a colloid which constitute a plant body.

3. The warm cloud catalyst according to claim 1, wherein the plant ash/plant powder/plant carbon powder has a particle size in a range of 0.5-150 μm.

4. The warm cloud catalyst according to claim 1, wherein the surfactant comprises surface active substances capable of reducing surface tension of water by 20%-85%.

5. The warm cloud catalyst according to claim 1, wherein the thickening agent comprises aqueous phase thickening agents.

6. The warm cloud catalyst according to claim 1, wherein the catalyst comprises the surfactant solution and the mass concentration of a solute is 0.5%-35% in the surfactant solution.

7. A method for preparing a warm cloud catalyst, wherein when the surfactant is in form of a solution, the method comprising:
    1) preparing the surfactant solution, wherein in the surfactant solution, the mass concentration of a solute is 0.5%-35%;
    2) evenly mixing 15-32 parts by weight of the prepared surfactant solution with 80-120 parts by weight of the plant ash/plant powder/plant carbon powder to obtain a mixture; and
    3) drying the mixture, then adding 2-10 parts of the thickening agent and evenly mixing, and then sieving to obtain a warm cloud catalyst,
    wherein the warm cloud catalyst comprises the following components in parts by weight:
        80-120 parts of a plant ash/plant powder/plant carbon powder,
        a surfactant, and
        2-10 parts of a thickening agent.

8. A method comprising:
    using a warm cloud catalyst in warm cloud precipitation, reservoir and pond water addition, precipitation redistribution, flood prevention and control or drought disasters, wherein the warm cloud catalyst comprises the following components in parts by weight:
        80-120 parts of a plant ash/plant powder/plant carbon powder,
        0.5-5 parts of a surfactant dry powder or 15-32 parts of a surfactant solution, and
        2-10 parts of a thickening agent.

9. The method of claim 7, wherein the plant ash/plant powder/plant carbon powder comprises dry powders of plant materials or powders resulting from burning or carbonizing of the plant materials, and further comprises non-plant materials having a density smaller than a density of water, wherein the plant materials further comprise a starch, a cellulose, a lignin and/or a colloid which constitute a plant body.

10. The method of claim 7, wherein the plant ash/plant powder/plant carbon powder has a particle size in a range of 0.5-150 μm.

11. The method of claim 7, wherein the surfactant comprises surface active substances capable of reducing surface tension of water by 20%-85%.

12. The method of claim 7, wherein the thickening agent comprises aqueous phase thickening agents.

13. The method of claim 7, wherein the mass concentration of a solute is 0.5%-35% in the surfactant solution.

14. A method for preparing a warm cloud catalyst, wherein when the surfactant is in form of a dry powder, the method comprising:
    a) grinding 2-20 parts of the dry plant ash/plant powder/plant carbon powder, together with 0.5-5 parts of the surfactant dry powder and 2-10 parts of the thickening agent dry powder, and sieving through a 200-mesh sieve, to obtain a surfactant and thickening agent dry powder with a smaller particle size;
    b) further fully mixing the rest plant ash/plant powder/plant carbon powder with the finer dry powder prepared in a), so as to disperse the surfactant and the thickening agent and reduce contents of the surfactant and of the thickening agent; and c) sieving the mixture prepared in b) to obtain the warm cloud catalyst, wherein the warm cloud catalyst comprises the following components in parts by weight:
- 80-120 parts of a plant ash/plant powder/plant carbon powder,
- 0.5-5 parts of a surfactant dry powder, and
- 2-10 parts of a thickening agent.

15. The method of claim 14, wherein the plant ash/plant powder/plant carbon powder comprises dry powders of plant materials or powders resulting from burning or carbonizing of the plant materials, and further comprises non-plant materials having a density smaller than a density of water, wherein the plant materials further comprise a starch, a cellulose, a lignin and/or a colloid which constitute a plant body.

16. The method of claim 14, wherein the plant ash/plant powder/plant carbon powder has a particle size in a range of 0.5-150 μm.

17. The method of claim 14, wherein the surfactant comprises surface active substances capable of reducing surface tension of water by 20%-85%.

18. The method of claim 14, wherein the thickening agent comprises aqueous phase thickening agents.

* * * * *